(12) United States Patent
Brume et al.

(10) Patent No.: US 8,351,146 B2
(45) Date of Patent: Jan. 8, 2013

(54) RECOVERY OPERATION STATUS INDICATOR FOR A TAPE DRIVE SYSTEM

(75) Inventors: Shawn Owen Brume, Tucson, AZ (US); Kevin Dale Butt, Tucson, AZ (US); Randy Clark Inch, Tucson, AZ (US); Hirokazu Nakayama, Fujisawa (JP); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 12/717,930

(22) Filed: Mar. 4, 2010

(65) Prior Publication Data

US 2011/0216444 A1    Sep. 8, 2011

(51) Int. Cl.
  *G11B 27/34*    (2006.01)
  *G11B 27/13*    (2006.01)
(52) U.S. Cl. ......................... 360/72.3; 360/69
(58) Field of Classification Search .......... None
  See application file for complete search history.

(56) References Cited

U.S. PATENT DOCUMENTS

| | | |
|---|---|---|
| 4,479,159 A | 10/1984 | Kamei et al. |
| 4,644,436 A | 2/1987 | Unno |
| 4,727,446 A | 2/1988 | Kaaden |
| 5,018,040 A | 5/1991 | Nishida |
| 5,469,308 A * | 11/1995 | Hamoda et al. ................. 360/71 |
| 5,729,652 A | 3/1998 | Hanson |
| 6,125,013 A * | 9/2000 | Choung ........................ 360/137 |
| 6,622,113 B2 | 9/2003 | Koski et al. |
| 6,791,781 B2 | 9/2004 | Bui et al. |
| 7,231,130 B2 * | 6/2007 | Ohno et al. ................... 386/243 |
| 7,873,865 B2 * | 1/2011 | Okada et al. ................. 714/6.12 |
| 8,108,639 B2 * | 1/2012 | Emaru et al. ................. 711/162 |

FOREIGN PATENT DOCUMENTS

JP      08263921 A * 10/1996

* cited by examiner

*Primary Examiner* — Hoa T Nguyen
*Assistant Examiner* — James L Habermehl

(57) ABSTRACT

A method, apparatus and computer-program product for indicating progress status of a mid-tape or data recovery operation in a tape drive. The method includes visually indicating that a recovery operation has started, periodically determining the remaining recovery time based on the remaining tape spool, and displaying the determined remaining recovery time to show progress status of the operation. The determination of the remaining recovery time includes determining the length of the tape being processed based on an estimated radius of the remaining tape spool and system parameters. The remaining recovery time is displayed with a moving track to show progress toward completion.

20 Claims, 6 Drawing Sheets

RECOVERY OPERATION STATUS INDICATOR FOR A TAPE DRIVE SYSTEM

FIELD OF THE INVENTION

The invention relates generally to data storage systems, and more particularly, to a progress status indicator for recovery operations in a tape drive system.

BACKGROUND

Computer tape drives continue to be the systems of choice for backing up large amount of persistent data in enterprise data centers due to their relatively low cost compared to other mass storage systems. Examples of common tape drive systems include the IBM System Storage TS1130 Tape Drive products offered by International Business Machines corporation of Armonk, N.Y.

A tape drive system typically records data onto a magnetic tape media enclosed in a tape cartridge and later retrieves the recorded data using a magnetic sensor commonly referred to as a magnetic tape head. In its operation, a tape drive system often needs to be in a recovery mode like a mid-tape recovery or a data restoration operation.

A mid-tape recovery is the process of powering on a drive with a tape cartridge already loaded and threaded. The drive will calculate the radius of a tape spool in the cartridge and then rewind to the physical beginning of tape. The tape is then un-threaded and re-threaded as if a new tape cartridge had just been loaded into the drive.

In a data restoration operation, the tape system tries to recover a portion of the recorded data on a tape media that has somehow been damaged or corrupted, and cannot be read by the tape head. The data recovery is typically done by rebuilding the damaged data from nearby data blocks and other information specifically stored on the tape for the purpose of data restoration such as error checking and correction (ECC) codes. As part of the recovery operation, the previously recorded data on the tape media is read by a tape head, verified of its validity by the tape drive system and then rewritten back to the tape media.

A tape recovery operation may last as long as thirty minutes in some tape drive systems during which an operator does not know when the operation will be completed. As a result, it often becomes an inconvenience because the operator may need to stay near a tape system and wait for the recovery operation to complete in order to remove the tape cartridge from the system.

There is therefore still a need in the art to provide a progress status indicator for a mid-tape or data recovery operation in a tape drive to inform the operator of the progress of the recovery operation.

SUMMARY

The present invention addresses the foregoing need by providing a method, apparatus and computer program product for a status indicator to show the progress of a mid-tape recovery or a data recovery operation in a tape drive system. Initially, the process visually indicates that the recovery operation has been started by the tape drive. In exemplary embodiments of the invention, a total recovery time T to unspool the tape from a supply reel at the beginning of the recovery operation is determined, based on an estimated radius of the tape spool.

Periodically and preferably at every second, a remaining recovery time T' is also calculated for the remaining tape on the spool using the same calculation method. The remaining recovery time T' is displayed on the drive preferably in the form of a Single Character Display (SCD). To show the ongoing recovery activity, the Single Character Display might be lit in the form of a moving track.

In exemplary embodiments of the invention, the total recovery time T is determined by estimating a radius R of the tape spool using a spool-radius estimation method based on angular position sensors, such as the method described by Koski et al. in U.S. Pat. No. 6,222,213. A "Hall count" HC related to the rotation of the supply reel is determined according to the formula $HC=(R-r)/t*24$, where R is the radius of the tape spool on the supply reel, r is the radius of the hub of the supply reel, t is the thickness of the tape media, and the constant 24 is for a reel motor having eight poles each with three sensors. The total length L of the tape spool on the supply reel at the beginning of the recovery operation is calculated according to the formula $L=pi*n^2+2*pi*n*r$, where $n=HC/24$ and pi is a physical constant. The total recovery time is then $T=L/s$, where s is a constant tape speed.

The remaining recovery time T' is periodically determined for the current position of the tape using the same calculation method.

In another embodiment of the invention, a tape drive with a status indicator for a recovery operation is described. The tape drive includes a tape media, a tape head for recording data onto and reading data from the tape, an indicator to show that a recovery operation has started, means for periodically determining a remaining recovery time based on an estimated radius of the remaining tape spool, and a display of the determined remaining recovery time. The remaining recovery time T' is displayed on the drive in a form of a Single Character Display (SCD) with a moving track.

In yet another aspect of the invention, a computer-program product is described for indicating status of a recovery operation in a tape drive. The product comprises a storage medium readable by a computer and embodies program instructions operable to visually indicate that the recovery operation has started, periodically determine a remaining recovery time based on an estimated radius of a tape spool being recovered, and display the determined remaining recovery time.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

BRIEF DESCRIPTION OF THE DRAWINGS

For a more complete understanding of the present invention, and the advantages thereof, reference is now made to the following description taken in conjunction with the accompanying drawings.

DETAILED DESCRIPTION OF THE INVENTION

Figure 1:
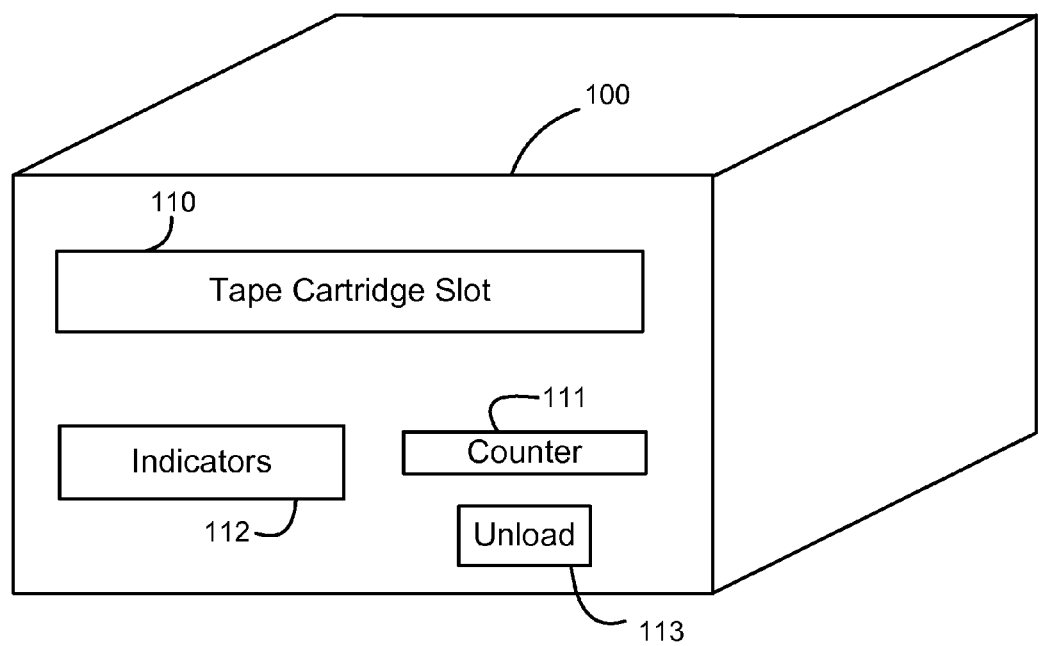
FIG. 1 illustrates a front view of an exemplary tape drive system in which aspects of the invention may be implemented.

The invention relates generally to computer tape drive systems. More particularly, the invention relates to a status indicator to show the progress of a mid-tape recovery or data recovery operation in a tape drive system.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described below illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a pictorial front view of an exemplary tape drive 100 in which aspects of the invention might be embodied. Tape drive 100 includes a tape cartridge slot 110 for receiving a tape cartridge, a counter 111 for showing a relative count relating to the current position of the tape, indicators 112 for displaying relevant information about the tape operations, and a unload button 113 for initiating an unloading of a tape cartridge from the drive 100. An example of the tape drive 100 is the Tape Drive product model TS1130 by International Business Machines corporation of Armonk, N.Y.

Figure 2:
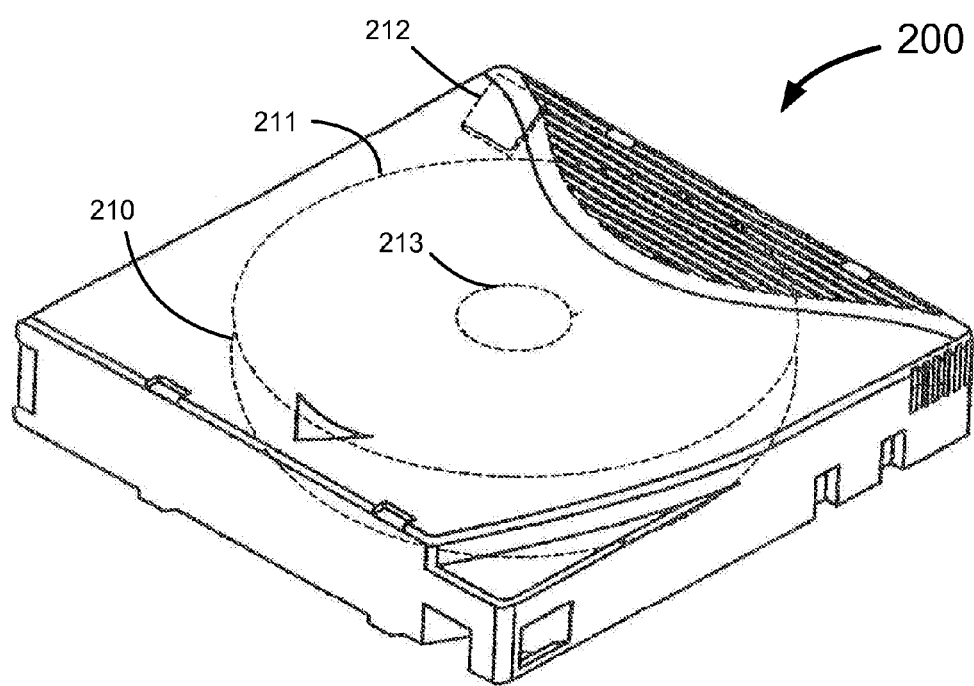
FIG. 2 illustrates a perspective view of an exemplary tape cartridge for use with the tape drive system in FIG. 1.

FIG. 2 shows a perspective view of an exemplary tape cartridge 200 for use in the tape drive system 100 of FIG. 1. The tape cartridge 200 has a reel hub 213, a reel 211 for holding tape media 210 which is wound around the reel hub 213. The tape cartridge 200 further includes a cartridge memory 212 for interfacing with the tape drive 100. The tape reel 200 is referred to as a single-reel cartridge as it includes only one tape reel 211 which acts as a supply reel during operation. A take-up reel for receiving the tape media 210 when the tape media 210 is being unspooled from the reel 211 is provided in the tape drive 100. In a different design of the tape drive 100, a take-up reel might be included in the cartridge 200 itself rather than in the drive system 100. Such a tape cartridge is referred to as a dual-reel cartridge.

Figure 3:
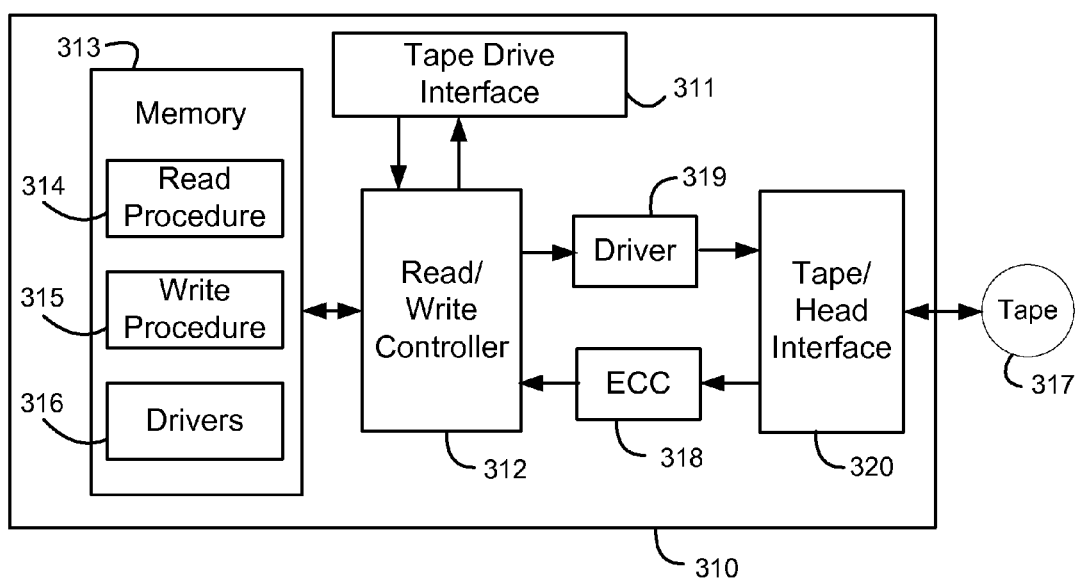
FIG. 3 is a block diagram representing main functional components in an exemplary control logic of a tape drive system in which aspects of the invention may be implemented.

FIG. 3 is a block diagram showing the main functional components of a tape drive control logic 310 in the tape drive 100. Tape drive control logic 310 contains a drive interface 311 for connecting to a host system. The control logic 310 also includes a controller 312 which controls the read/write operations of tape drive 100. Control logic 310 may include a memory 313 for maintaining a variety of executable instructions including read procedure 314, write procedure 315 and drivers 316. A write operation may be performed by the controller 312 by executing the write procedure 315. Data to be written onto tape 317 are encoded by controller 312 and transmitted to driver 319. Similarly, a read operation may be performed by controller 312 by executing the read procedure 314. Control logic 310 also includes error checking and correcting (ECC) logic 318 for verifying data and recovering corrupted data caused by errors when reading from tape 317. The data that is to be written onto and read from tape 317 is transmitted through a tape-head interface 320.

Figure 4:
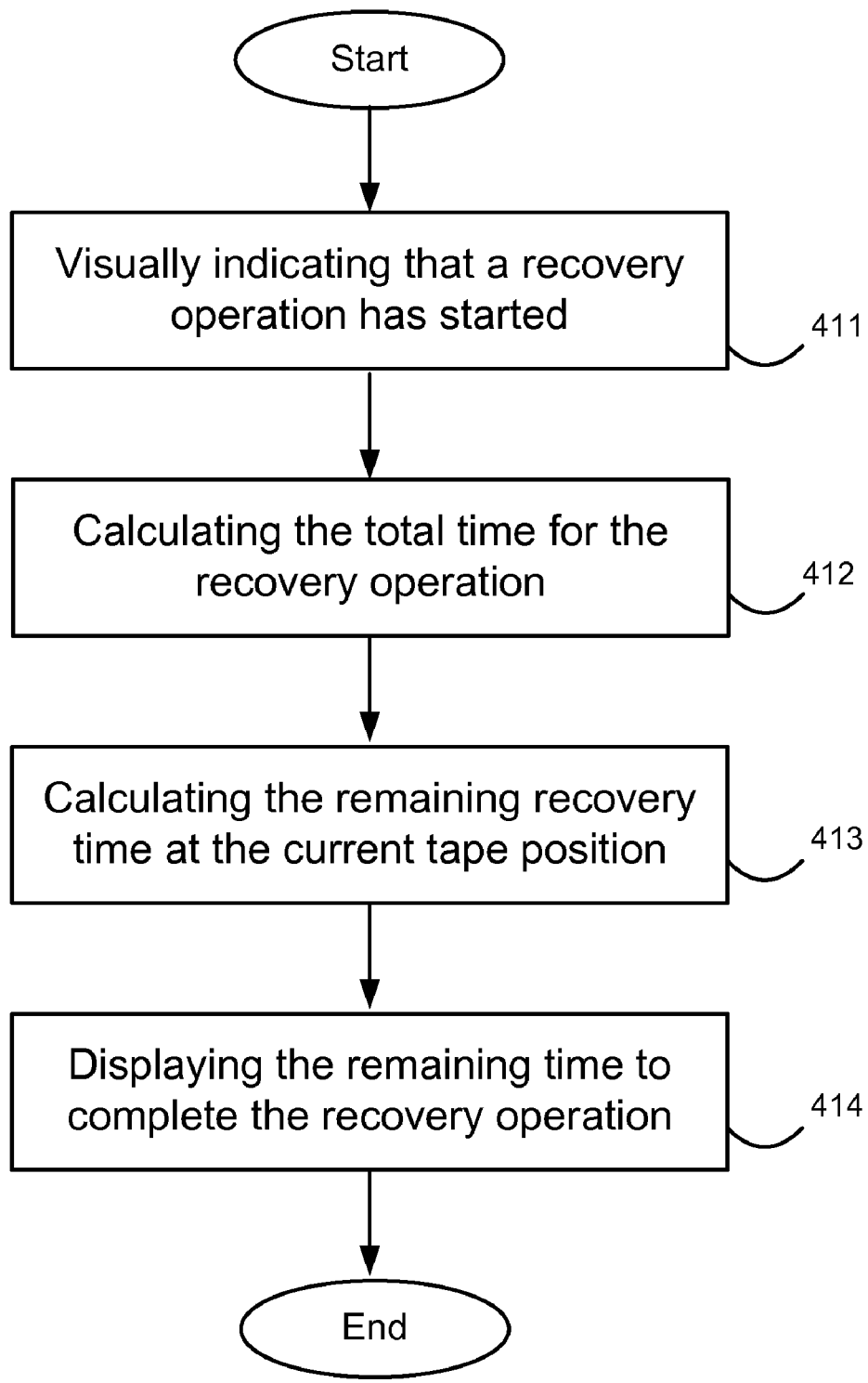
FIG. 4 is a flow chart representing an exemplary embodiment of a process for indicating progress status of a recovery operation in a tape drive, in accordance with aspects of the invention.
Figure 6:
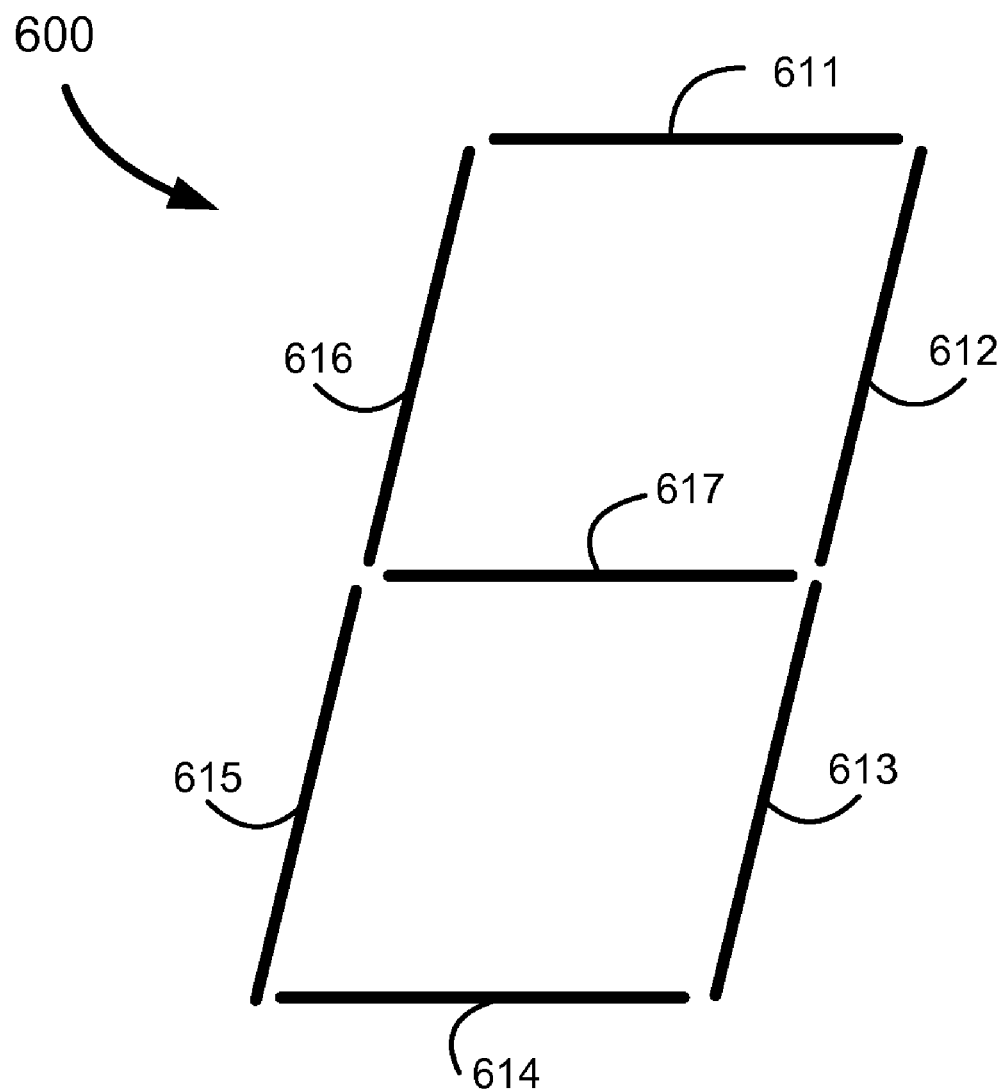
FIG. 6 illustrates an exemplary Single Character Display for displaying the progress and remaining time of the recovery operation in accordance to aspects of the invention.

FIG. 4 is a flow chart depicting an exemplary embodiment of a process for indicating progress status of a recovery operation in a tape drive, in accordance with aspects of the invention. Initially, the process visually indicates that a recovery operation has been started in the tape drive, at block 411. The total recovery time T, i.e., the time it takes to completely unspool the tape media from the supply reel at the beginning of the recovery operation, is calculated at block 412. As the tape is being unspooled, a remaining recovery time T' is periodically calculated, preferably at every second, at block 413. The remaining recovery time T' is then displayed on the drive at block 414. The display might be provided using Single Character Displays (SCD) as illustrated in FIG. 6. A Single Character Display might be lit in the form of a moving track to show that the recovery operation is currently being performed by the drive system.

In another exemplary embodiment of the invention, the remaining recovery time T' might be displayed as a percentage of the completion of the recovery operation. For example, this percentage might be calculated as $100*(1-T'/T)$ where T is the total recovery time and T' is the remaining recovery time as determined at the current position of the tape.

Figure 5:
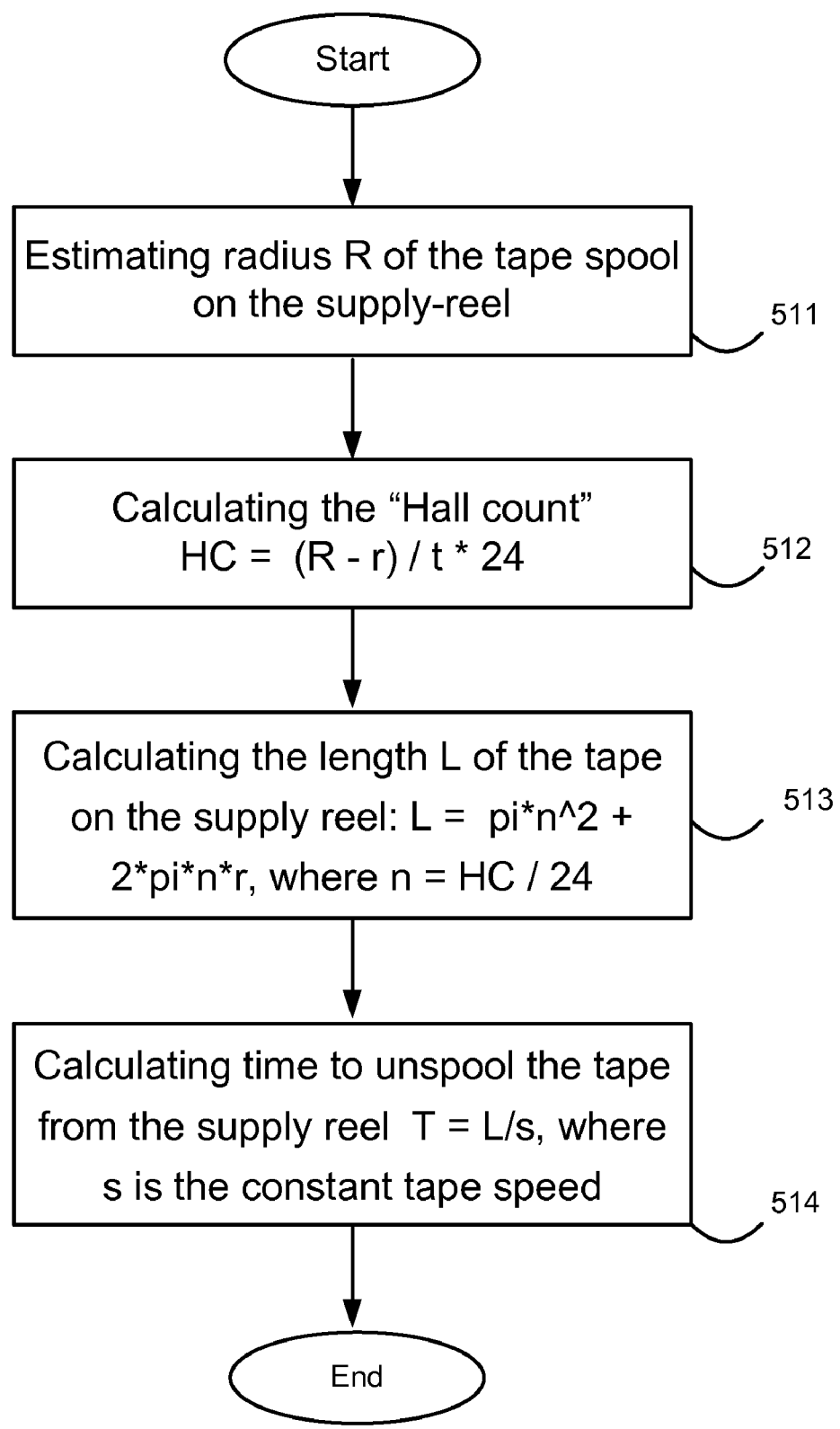
FIG. 5 is a flow chart representing an exemplary embodiment of a method for calculating a total recovery time T.

FIG. 5 is a flow chart representing an exemplary embodiment of the process for calculating the total recovery time T. At block 511, the radius R of the tape spool on the supply reel is determined using a spool-radius estimation method based on angular position sensors, such as the methods described by Koski et al. in U.S. Pat. No. 6,222,213. At block 512, a "Hall count" HC related to the number of revolutions of the supply reel to unspool the tape is determined according to the formula $HC=(R-r)/t*24$, where R is the radius of the tape spool on the supply reel, r is the radius of the hub of the supply reel, and t is the thickness of the tape media. The values r and t are known based on the particular reels and tape cartridges being used in the tape system. As an example, the hub radius r and tape media thickness t for IBM Linear Tape-Open (LTO) tape cartridges are typically 22 millimeters and 6.4 microns, respectively.

The constant twenty-four is a parameter that depends on the physical design of the motor driving the tape reels. As an example, for a particular motor design that has eight electromagnetic poles with three sensors for each poles, then twenty-four Hall signals would be sensed by the sensors per one revolution of the motor. For a reel motor with sixteen electromagnetic poles and three sensors, the corresponding constant would be forty-eight. Further details on Hall count detection and calculations are described in U.S. Pat. No. 6,791,781 and are hereby incorporated by reference.

The total length L of the tape spool on the supply reel at the beginning of the recovery operation is next calculated at block 513 according to the formula $L=pi*n^2+2*pi*n*r$, where $n=HC/24$ and pi is a physical constant. The value n is the number of revolutions of the supply reel to unspool the tape of length L. The total time T for the recovery operation to be completed is then determined in block 514 according to the formula $T=L/s$, where s is a constant tape speed. The constant tape speed s is a known parameter of the particular tape drive model.

Using the same calculation method described above, a remaining recovery time T' is periodically determined at the current position of the tape, preferably at every second, to show progress of the recovery operation, per block 515. At block 516, the remaining recovery time T' is visually displayed on the drive to inform an operator of the progress of the recovery operation. The remaining time might be shown in the form of the remaining time to completion or a percentage of completion of the operation.

FIG. 6 illustrates an exemplary Single Character Display 600 for indicating the progress of the recovery operation in the form of a moving track and the remaining recovery time T'. For example, a moving track might be achieved by energizing the LED segments 611 through 617 of the Single Character Display 600 in the sequence of 611-612-617-615-614-613-617-616, and then repeating the same sequence.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

What is claimed is:

1. A computer-implemented method for indicating status of a recovery operation in a tape drive, comprising:
   visually indicating that the recovery operation has started;
   periodically determining a remaining recovery time based on an estimated radius of a tape spool being recovered; and displaying the determined remaining recovery time.

2. The method of claim 1, wherein the determination of the remaining recovery time includes determining a length L of a tape spool being recovered based on a radius R of the tape spool.

3. The method of claim 2, wherein the tape length is determined based on a Hall count associated with the rotation of the tape spool.

4. The method of claim 3, wherein the Hall count is equal to $(R-r)/t*24$, where R is the radius of the tape spool being recovered, r is a hub radius of the tape spool, and t is a thickness of the tape.

5. The method of claim 3, wherein the tape length L is calculated as $L=(pi*n^2)+(2*pi*r)$, where $n=HC/24$, r is a hub radius of the tape spool, HC is the Hall count, and pi is a physical constant.

6. The method of claim 2, wherein the radius R of tape spool is estimated using an angular position sensor-based method.

7. The method of claim 2, wherein the remaining recovery time is equal to the tape length L divided by a constant tape speed s.

8. The method of claim 1, further comprising determining a total recovery time at the beginning of the recovery operation and displaying a percentage of completion based on the remaining recovery time and the total recovery time.

9. The method of claim 1, wherein the remaining recovery time is periodically determined.

10. The method of claim 1, wherein the remaining recovery time is displayed with a moving track to show recovery progress.

11. A tape drive, comprising:
a magnetic tape having data recorded thereon;
a head for recording and reading data on the tape;
a tape reel for spooling the tape in a data recovery operation;
an indicator that the data recovery operation has started;
means for periodically determining a remaining recovery time based on an estimated radius of a tape spool being recovered; and
a display of the determined remaining recovery time.

12. A computer-program product for indicating status of a data recovery operation in a tape drive, the product comprising a non-transitory storage medium readable by a computer and embodying program instructions executable by the computer to:
visually indicate that the data recovery operation has started;
periodically determine a remaining recovery time based on an estimated radius of a tape spool being recovered; and
display the determined remaining recovery time.

13. The computer-program product of claim 12, wherein the determination of the remaining recovery time includes determining a length L of the tape spool being recovered based on an estimated radius R of the tape spool.

14. The computer-program product of claim 13, wherein the tape length L is determined based on a Hall count value "HC" associated with a motor coupled to the tape spool.

15. The computer-program product of claim 14, wherein the Hall count value "HC" is equal to $(R-r)/t*24$, where R is the estimated radius of the tape spool, r is a hub radius of the tape spool, and t is the thickness of the tape.

16. The computer-program product of claim 14, wherein the tape length L is calculated as $L=(pi*n^2)+(2*pi*r)$, where n is equal to HC/24, r is a hub radius of the tape spool, and pi is a physical constant.

17. The computer-program product of claim 13, wherein the radius R of tape spool is estimated using an angular position sensor-based method.

18. The computer-program product of claim 13, wherein the remaining recovery time is equal to the tape length L divided by a tape speed s.

19. The computer-program product of claim 12, wherein the program instructions further calculate a total recovery time at the beginning of the recovery operation and display a percentage of completion based on the remaining recovery time and the total recovery time.

20. The computer-program product of claim 12, wherein the remaining recovery time is displayed with a moving track to show recovery progress.

\* \* \* \* \*